3,121,736
MANUFACTURE OF NITRODIARYLAMINES
John P. Luvisi, Park Ridge, and Louis Schmerling, Riverside, Ill., assignors to Universal Oil Products Company, Des Plaines, Ill., a corporation of Delaware
No Drawing. Filed May 31, 1960, Ser. No. 32,542
8 Claims. (Cl. 260—576)

This invention relates to a process for the preparation of nitrodiarylamines by the reaction of amino aromatic compounds with halonitro aromatic compounds. In a preferred embodiment, the present invention relates to the condensation of aniline with chloronitrobenzene in the presence of a metal complexing agent. This application is a continuation-in-part of our copending application Serial No. 781,877, filed December 22, 1958, now Patent No. 3,053,896, September 11, 1962.

An object of this invention is to provide a novel process for the manufacture of diarylamino componds useful in themselves and as chemical intermediates. A more specific object relates to a process by which versatile chemical intermediates such as p-nitrodiphenylamine can be prepared by direct condensation methods in excellent yields and with a minimum formation of tars.

An economical and convenient method for the manufacture of p-nitrodiphenylamine is highly desirable since its reductive alkylation with cyclohexanone, for example, yields N-phenyl-N-cyclohexyl-p-phenylenediamine, which is an antiozonant for rubber. In addition, p-nitrodiphenylamine has in itself desirable inhibitor characteristics in respect to gasolines.

The cheapest and possibly most convenient method of manufacture of p-nitrodiphenylamine appears to be by direct condensation methods. While p-nitrochlorobenzene has been condensed with aniline to form p-nitrodiphenylamine in good yields in laboratory apparatus, when it is attempted to duplicate such reaction on a pilot plant or commercial scale, tar formation becomes excessive to the extent that large scale manufacture on an economical basis is impractical. It has now been discovered that the above difficulties are overcome to a considerable extent by the utilization of certain chemical agents herein referred to as metal complexing agents. Said chemical agents are characterized by their unique ability to form organometallic complexes with trace amounts of metals. Such metal complexing agents will be more fully described in the subsequent specifications.

One embodiment of this invention relates to a process which comprises reacting a chloro nitro aromatic compound with an amino aromatic compound of the general formula $ArNH_2$ in which Ar is an aromatic hydrocarbon radical, in the presence of a catalytic amount of a copper catalyst, a hydrochloric acid acceptor, and a metal complexing agent at an elevated temperature while maintaining substantially anhydrous reaction conditions.

Another embodiment is in a process which comprises reacting chloronitrobenzene with an amino aromatic compound of the general formula $ArNH_2$ in which Ar is an aromatic hydrocarbon radical, in the presence of a catalytic amount of a copper salt, potassium carbonate, and a disalicylaldiaminoalkane at an elevated temperature while maintaining substantially anhydrous reaction conditions.

A further embodiment relates to a process which comprises reacting chloronitrobenzene with an amino aromatic compound of the general formula $ArNH_2$ in which Ar is an aromatic hydrocarbon radical, in the presence of a catalytic amount of a copper salt, potassium carbonate, and an ortho-hydroxybenzalaminophenol at an elevated temperature while maintaining substantially anhydrous reaction conditions.

A still further embodiment is in a process which comprises reacting chloronitrobenzene with an amino aromatic compound of the general formula $ArNH_2$ in which Ar is an aromatic hydrocarbon radical, in the presence of a catalytic amount of a copper salt, potassium carbonate, and an aminopolycarboxylic acid at an elevated temperature while maintaining substantially anhydrous reaction conditions.

A more specific embodiment is in a process for the manufacture of p-nitrodiphenylamine which comprises reacting p-chloronitrobenzene with aniline in the presence of a catalytic amount of cuprous chloride, potassium carbonate, and ethylenediaminetetraacetic acid at a temperature of from about 150° C. to about 225° C. while maintaining substantially anhydrous reaction conditions.

In accordance with the process of this invention a chloro nitro aromatic compound is reacted with an amino aromatic compound in the presence of a copper catalyst, a hydrochloric acid acceptor, and a metal complexing agent at an elevated temperature while maintaining substantially anhydrous reaction conditions.

Illustrative chloro nitro aromatic compounds which may be used include the three chloronitrobenzenes namely, o-chloronitrobenzene, m-chloronitrobenzene and p-chloronitrobenzene, chloronitroalkylbenzenes including 4-chloro-2-nitrotoluene, 5-chloro-2-nitrotoluene, 2-chloro-5-nitrotoluene, and other isomeric chloronitrotoluenes; 4-chloro-2-nitroethylbenzene, 5-chloro-2-nitroethylbenzene, 5-chloro-3-nitroethylbenzene, 4-chloro-2-nitropropylbenzene- and other chloronitroethylbenzenes; 5-chloro-2-nitropropylbenzene, 5-chloro-3-nitropropylbenzene, etc.; 4-chloro-2-nitroisopropylbenzene, 5-chloro-2-nitroisopropylbenzene, 5-chloro-3-nitroisopropylbenzene, etc.; and other C-alkylated chloronitrobenzenes; and chloronitronaphthalenes including 4-chloro-1-nitronaphthalene, 2-chloro-1-nitronaphthalene, and other chloronitronaphthalenes; and chloro nitro derivatives of other aromatic hydrocarbons. The preferred chloro nitro aromatic compounds are those containing no functional groups other than chlorine and the nitro group and those in which the nitro group is in para position to the chlorine. In a preferred embodiment of this invention the chloro nitro aromatic compound is p-chloronitrobenzene.

It is contemplated that other halo nitro aromatic compounds may be used although not necessarily with equivalent results. Suitable halo aromatic compounds are such as p-bromonitrobenzene, o-bromonitrobenzene, m-bromonitrobenzene, p-fluoronitrobenzene, o-fluoronitrobenzene, m-fluoronitrobenzene, p-iodonitrobenzene, o-iodonitrobenzene, m-iodonitrobenzene, etc.

The chloronitro aromatic compound is reacted with an amino aromatic compound including aniline, o-toluidine, m-toluidine, p-toluidine, o-ethylaniline, m-ethylaniline, p-ethylaniline, o-propylaniline, m-propylaniline, p-propylaniline, o-isopropylaniline, m-isopropylaniline, p-isopropylaniline, o-butylaniline, m-butylaniline, p-butylaniline, o-sec-butylaniline, m-sec-butylaniline, p-sec-butylaniline, o-isobutylaniline, m-isobutylaniline, p-isobutylaniline, o-tert-butylaniline, m-tert-butylaniline, p-tert-butylaniline, o-nitroaniline, m-nitroaniline, p-nitroaniline, alpha-naphthylamine, beta-naphthylamine, etc. Mono-N-alkyl derivatives of these amines may also be used but not necessarily with equivalent results. In general, primary amino aromatic compounds having the general formula $ArNH_2$ are preferred, Ar being an aromatic hydrocarbon radical. In a preferred embodiment the amino aromatic compound is aniline.

The halo nitro aromatic compound is reacted with an amino aromatic compound in the presence of a copper catalyst. While cuprous chloride is preferred, other copper catalysts may be used including cuprous oxide, copper bromides, copper fluorides, copper iodides, copper nitrate, copper sulfate, etc.

In the condensation reaction, hydrogen chloride is formed during the course of the reaction. The hydrogen chloride formed is removed in order to prevent the undesirable formation of the hydrogen chloride salt of the amino aromatic reactant. It is preferred to utilize at least stoichiometric quantities of potassium carbonate as a hydrogen chloride acceptor. Other hydrogen chloride acceptors such as sodium carbonate, calcium carbonate, cesium carbonate, sodium hydroxide, potassium hydroxides, etc., can be utilized but not necessarily with equivalent results.

An essential feature of the present invention is the utilization of a metal complexing agent to substantially eliminate undesirable tar formation. Metal complexing agents refer to chelating, or sequestering agents, such as amino carboxylic acids, alkylenediaminopolycarboxylic acids, disalicylaldiamino alkanes, ortho-hydroxybenzalamino phenols, and the like.

In one embodiment of this invention alkylenediaminopolycarboxylic acids, particularly the alkali metal salts thereof, are preferred. Said acids include ethylenediaminetetraacetic acid, N-2-hydroxyethylethylenediaminetriacetic acid, etc., the tetra sodium salt of the former being preferred.

In another embodiment a disalicylaldiamino alkane is used, such as disalicylaldiaminomethane, disalicylaldiaminoethane, disalicylaldiaminopropane, disalicylaldiaminobutane, disalicylaldiaminopentane, disalicylaldiaminohexane, disalicylaldiaminoheptane, disalicylaldiaminooctane, etc. 1,2-disalicylaldiaminopropane is preferred.

In still another embodiment an ortho-hydroxybenzalaminophenol is utilized—preferably orthohydroxybenzal-o-aminophenol.

Illustrative amino carboxylic acids which serve as metal complexing agents include aspartic acid, glutamic acid, tryptophan, valine, phenylalanine, etc. Other metal complexing agents include polyphosphates, carboxymethylmercaptosuccinic acid, certain Schiff bases of salicylaldehydes, etc.

The ultimate product yield is largely dependent upon a substantially anhydrous reaction media. It is therefore desirable that there be provision for the continuous separation and removal of water, formed by the reaction between potassium carbonate and hydrogen chloride, for example, from the reaction zone. Such separation can be accomplished in any suitable manner. A preferred method is by azeotropic distillation wherein the water is continuously removed by reflux methods as an azeotropic mixture with an inert diluent, such as benzene, or with the aromatic amine reactant, provision usually being made for recycling the aromatic amine reactant or the diluent to the reaction zone.

Reaction temperatures in the range of from about 150° C. to about 300° C., and preferably in the range of from about 175° C. to about 225° C. are utilized. Pressure does not appear to be an important variable in this process, except that superatmospheric pressures are preferred to control the reflux rate when operating within the aforesaid temperature ranges. It follows that the desired pressure will vary with the particular reactants and diluent utilized. The pressure can be autogenous to 1000 p.s.i.g. or more.

In general, a molar excess of the amino aromatic compound to the chloro nitro compound is utilized. The molar excess can be as much as 10:1 or more. However, when utilizing an inert diluent such as benzene, excessive amounts of the amino aromatic compound are not necessary and it is preferred that the molar excess in such case be in a lower ratio, say from about 5:4 to about 3:1.

In one embodiment, the process of this invention is effected by a batch type of operation wherein the reactants, catalyst, hydrogen chloride acceptor, and metal complexing agent are charged to a suitable high pressure reactor, such as a steel autoclave. The reactor is equipped with the necessary heating elements as well as the means to agitate the reaction mixture such as by mechanical stirring. In addition the reactor has incorporated therewith a reflux condenser and a receiver wherein the refluxing azeotropic mixture is collected, the water separated therefrom, and the diluent, or the amino aromatic solvent as the case may be, is recycled to the reaction zone. The reactor is heated and the reactants agitated until such time as water is no longer recovered from the reflux receiver. The reactor contents are thereafter water washed, dried, and distilled to recover the desired product.

In another embodiment, the present process may be effected in a continuous manner. Thus, in one type of operation, the catalyst and the hydrogen chloride acceptor can be continuously charged to the reaction zone as a slurry or suspension in one or both of the reactant materials, or in a suitable diluent, such as benzene. In still another type of operation a moving catalyst bed may be employed whereby the charge is continuously passed either concurrently or countercurrently to a moving catalyst bed and a hydrogen chloride acceptor. Another type of operation is the fixed bed type of operation wherein the reactants in company with a metal complexing agent are continuously charged to a reaction zone containing therein a fixed bed of catalyst said catalyst being commingled with a hydrogen chloride acceptor or in separate and alternating layers therewith.

The reactants can be pre-mixed in the desired ratio and thereafter charged to the reactor in a single stream, or said reactants can be charged individually and in separate streams In either case it is preferred that the reactants be charged in a diluted state, as with benzene, the metal complexing agent being incorporated in at least one of the charge streams.

The reactor effluent can be passed to a water separator wherein water is continuously or periodically withdrawn and measured as a means of observing the extent of the reaction. The reaction product, from which water has been removed, is thereafter passed through a waterwash, separated therefrom and dried. The dried reaction product is then charged to a fractionating column for product recovery and separation of unreacted materials, provision being made for recycle of the unreacted materials.

The following examples are presented to illustrate the process of this invention and are not intended to limit the generally broad scope of the present invention in strict accordance therewith.

*Example I*

Three moles of aniline, 2 moles of p-chloronitrobenzene, 2.5 moles of benzene, 138 grams of potassium carbonate, 30 grams of cuprous chloride, and 5 grams of the tetra sodium salt of ethylenediaminetetraacetic acid were charged to a 3 liter steel autoclave. The pressure was raised to 60–75 p.s.i.g. by charging a stream of nitrogen to the lower portion of the autoclave. The nitrogen stream also served to aid the reflux process. The autoclave embodied an overhead reflux condenser and receiver wherein the refluxing azeotropic mixture was collected. The receiver was designed to allow for water draw-off and the organic portion of the azeotropic mixture was recycled to the reaction mixture. The reaction mixture was stirred by mechanical means and heated at about 210° C. for 24 hours. At the completion of this reaction period water formation had ceased, 27 cc. having been recovered. The autoclave contents were allowed to cool to about 135° C. and water washed twice with hot water. The water was separated, the washed reaction mixture dried and distilled. The benzene was removed by atmospheric distillation and the unreacted aniline was distilled off under reduced pressure. The remaining product consisted of 15% unreacted p-nitrochlorobenzene, 80% p-nitrodiphenylamine and 5% higher boiling materials.

Example II

Three moles of aniline, 2 moles of p-chloronitrobenzene, 2.5 moles of benzene, 138 grams of potassium carbonate, and 30 grams of cuprous chloride were charged to a 3 liter steel autoclave. The metal complexing agent was omitted from the reaction mixture in this example. The pressure was raised to 60–75 p.s.i.g. by charging a stream of nitrogen as described in the previous example. The reaction mixture was stirred and heated at about 210° C. for a 24 hour period. At the completion of this reaction period 24 cc. of water had been recovered from the overhead reflux condenser. The reaction product was cooled, washed with hot water, and dried. The dried reaction mixture was distilled to remove the benzene and the unreacted aniline. The remaining product consisted of less than 2% unreacted p-chloronitrobenzene, 78% p-nitrodiphenylamine, and 20% of higher boiling materials.

It will be noted that tar formation, represented by materials boiling above p-nitrodiphenylamine, rises from 5% to 20% upon the elimination of the metal complexing agent from the reaction mixture.

Example III

Three moles of 1-naphthylamine, 2 moles of p-chloronitrobenzene, 2.5 moles of benzene, 138 grams of potassium carbonate, 30 grams of cuprous chloride, and 5 grams of the tetrasodium salt of ethylenediaminetetraacetic acid are charged to a 3 liter steel autoclave. The pressure is raised to 60–75 p.s.i.g. by charging a stream of nitrogen as previously described. The reaction mixture is stirred and heated at about 220° C. for a 24 hour period. At the completion of this reaction period about 24 cc. of water is recovered from the overhead reflux condenser. The reaction product is cooled, washed with hot water, and dried. Benzene and unreacted 1-naphthylamine are separated from the dried reaction mixture by atmospheric distillation followed by distillation at reduced pressure. The remaining product is recovered as a solid and comprises N-(p-nitrophenyl)-1-naphthylamine. Effecting the reaction in the presence of the tetrasodium salt of ethylenediaminetetraacetic acid reduces the amount of higher boiling materials normally formed in the reaction.

Example IV

Three moles of p-toluidine, 2 moles of p-chloronitrobenzene, 2.5 moles of benzene, 138 grams of potassium carbonate, 30 grams of cuprous sulfate, and 10 grams of the tetrasodium salt of ethylenediaminetetraacetic acid are charged to a 3 liter steel autoclave. The pressure is raised to 60–75 p.s.i.g. by charging a stream of nitrogen as previously described. The reaction mixture is stirred and heated to about 215° C. for a 24 hour period. At the completion of this reaction period about 24 cc. of water is recovered from the overhead reflux condenser. The reaction product is cooled, washed with hot water, and dried. Benzene and unreacted p-toluidine are separated from the dried reaction mixture by atmospheric distillation followed by distillation at reduced pressure. The remaining product is recovered as a solid and comprises 4-methyl-4′-nitrodiphenylamine. Effecting the reaction in the presence of the tetrasodium salt of ethylenediaminetetraacetic acid reduces the amount of higher boiling materials normally formed in the reaction.

Example V

Three moles of aniline, 2 moles of p-bromonitrobenzene, 2.5 moles of benzene, 138 grams of potassium carbonate, 30 grams of cuprous oxide, and 10 grams of 1,2-disalicylaldiamino propane are charged to a 3 liter steel autoclave. The pressure is raised to 60–75 p.s.i.g. by charging the stream of nitrogen as previously described. The reaction mixture is stirred and heated at about 200° C. for a 24 hour period. At the completion of this reaction period about 24 cc. of water is recovered from the overhead reflux condenser. The reaction product is cooled, washed with hot water, and dried. The dried reaction mixture is distilled to remove the benzene and unreacted aniline. The remaining product is recovered as a solid and comprises p-nitrodiphenylamine. Effecting the reaction in the presence of 1,2-disalicylaldiamino propane reduces the amount of higher boiling materials normally formed in the reaction.

Example VI

Three moles of aniline, 2 moles of p-chloronitrobenzene, 2.5 moles of benzene, 138 grams of potassium carbonate, 30 grams of cuprous oxide and 10 grams of o-hydroxybenzal-o-aminophenol are charged to a 3 liter steel autoclave. The pressure is raised to 60–75 p.s.i.g. by charging the stream of nitrogen as previously described. The reaction mixture is stirred and heated at about 210° C. for a 24 hour period. At the completion of this reaction period about 24 cc. of water is recovered from the overhead reflux condenser. The reaction product is cooled, washed with hot water, and dried. The dried reaction mixture is distilled to remove the benzene and unreacted aniline. The remaining product is recovered as a solid and comprises p-nitrodiphenylamine. Effecting the reaction in the presence of o-hydroxybenzal-o-aminophenol reduces the amount of higher boiling materials normally formed in the reaction.

We claim as our invention:

1. A process for the preparation of a nitrodiarylamine which comprises reacting a chloronitro aromatic compound in which the chlorine and the nitro group are the only functional groups with an amino aromatic compound of the general formula $ArNH_2$ in which Ar is an aromatic hydrocarbon radical, in the presence of a catalytic amount of a copper catalyst selected from the group consisting of copper oxides and copper salts, a hydrogen chloride acceptor, and a chelating agent at an elevated temperature while maintaining substantially anhydrous reaction conditions.

2. A process for the preparation of a nitrodiarylamine which comprises reacting chloronitrobenzene with an amino aromatic compound of the general formula $ArNH_2$ in which Ar is an aromatic hydrocarbon radical, in the presence of a catalytic amount of a copper catalyst selected from the group consisting of copper oxides and copper salts, a hydrogen chloride acceptor, and a chelating agent at an elevated temperature while maintaining substantially anhydrous reaction conditions.

3. A process for the preparation of a nitrodiarylamine which comprises reacting chloronitrobenzene with an amino aromatic compound of the general formula $ArNH_2$ in which Ar is an aromatic hydrocarbon radical, in the presence of a catalytic amount of cuprous chloride, potassium carbonate, and the tetra sodium salt of ethylene-diaminetetraacetic acid at a temperature of from about 150° C. to about 300° C. while maintaining substantially anhydrous reaction conditions.

4. A process for the preparation of p-nitrodiphenylamine which comprises reacting p-chloronitrobenzene with aniline in the presence of a catalytic amount of cuprous chloride, potassium carbonate, and the tetra sodium salt of ethylenediaminetetraacetic acid at a temperature of from about 175° C. to about 225° C. while maintaining substantially anhydrous reaction conditions.

5. A process for the preparation of 4-methyl-4′-nitrodiphenylamine which comprises reacting p-toluidine with p-chloronitrobenzene in the presence of a catalytic amount of cuprous chloride, potassium carbonate, and the tetra sodium salt of ethylenediaminetetraacetic acid at a temperature of from about 175° C. to about 225° C. while maintaining substantially anhydrous reaction conditions.

6. A process for the preparation of N-(p-nitrophenyl)-1-naphthylamine which comprises reacting 1-naphthylamine with p-chloronitrobenzene in the presence of a catalytic amount of cuprous chloride, postassium carbonate, and the tetra sodium salt of ethylenediaminetetraacetic acid at a temperature of from about 175° C. to about 225° C. while maintaining substantially anhydrous reaction conditions.

7. A process for the preparation of p-nitrodiphenylamine which comprises reacting p-chloronitrobenzene with aniline in the presence of a catalytic amount of cuprous chloride, potassium carbonate, 1,2-disalicylaldiaminopropane at a temperature of from about 175° C. to about 225° C. while maintaining substantially anhydrous reaction conditions.

8. A process for the preparation of p-nitrodiphenylamine which comprises reacting p-chloronitrobenzene with aniline in the presence of a catalytic amount of cuprous chloride, potassium carbonate, and o-hydroxybenzal-o-aminophenol at a temperature of from about 175° C. to about 225° C. while maintaining substantially anhydrous reaction conditions.

References Cited in the file of this patent
UNITED STATES PATENTS

| | | |
|---|---|---|
| 2,924,620 | Miller | Feb. 9, 1960 |
| 2,927,943 | Merz | Mar. 8, 1960 |